US008793799B2

(12) United States Patent
Fritzson et al.

(10) Patent No.: US 8,793,799 B2
(45) Date of Patent: Jul. 29, 2014

(54) SYSTEMS AND METHODS FOR IDENTIFYING AND MITIGATING INFORMATION SECURITY RISKS

(75) Inventors: Art Fritzson, Fairfax Station, VA (US); Semion Bezrukov, McLean, VA (US); Sean Palka, Reston, VA (US)

(73) Assignee: Booz, Allen & Hamilton, McLean, VA (US)

( * ) Notice: Subject to any disclaimer, the term of this patent is extended or adjusted under 35 U.S.C. 154(b) by 96 days.

(21) Appl. No.: 13/297,570

(22) Filed: Nov. 16, 2011

(65) Prior Publication Data

US 2012/0124671 A1    May 17, 2012

Related U.S. Application Data

(60) Provisional application No. 61/414,142, filed on Nov. 16, 2010, provisional application No. 61/502,678, filed on Jun. 29, 2011.

(51) Int. Cl.
G06F 11/00 (2006.01)
G06F 12/14 (2006.01)
G06F 12/16 (2006.01)
G08B 23/00 (2006.01)
H04L 29/06 (2006.01)
G06Q 10/10 (2012.01)

(52) U.S. Cl.
CPC ........ H04L 63/1441 (2013.01); H04L 63/1483 (2013.01); *G06Q 10/107* (2013.01)
USPC ................ 726/25; 726/22; 709/206; 709/224

(58) Field of Classification Search
CPC . H04L 63/14; H04L 63/1441; H04L 63/1483; G06Q 10/107
USPC ..................................................... 726/22–25
See application file for complete search history.

(56) References Cited

U.S. PATENT DOCUMENTS 7,281,031 B1 * 10/2007 Wang et al. ................... 709/213
7,668,921 B2    2/2010 Proux et al.
(Continued)

FOREIGN PATENT DOCUMENTS

JP    2006-285844 A    10/2006
JP    2007-323640 A    12/2007
WO    WO 2011/017196 A2    2/2011

OTHER PUBLICATIONS

"APWG/CMU CUPS Phishing Education Landing Page Project," Apr. 2009, http://education.apwg.org.*

(Continued)

Primary Examiner — Tae Kim
(74) Attorney, Agent, or Firm — Buchanan Ingersoll & Rooney

(57) ABSTRACT

Methods and systems for Sustained Testing and Awareness Refresh against Phishing threats (STAR*Phish™) are disclosed. In an embodiment, a method assigns schemes and unique identifiers to target e-mail addresses associated with a user accounts. The method delivers e-mail messages to the targeted e-mail addresses, the e-mail messages comprising an HTTP request and a unique identifier associated with each of the user accounts. The method then receives, at a Phishing Metric Tool (PMT), a response including the unique identifier. The PMT logs training requirements for the user accounts, tracks response metrics for the training requirements, and redirects the respective HTTP requests to a phishing training tool (PTT). The PTT sends a notification of the user account identities and the unique identifiers to the PMT and returns a status for the training requirements for the user accounts. Upon completion of the training, the PMT sends completion notifications for the user accounts.

20 Claims, 14 Drawing Sheets

(56) References Cited

U.S. PATENT DOCUMENTS

| | | | |
|---|---|---|---|
| 7,971,246 | B1 | 6/2011 | Emigh et al. |
| 8,220,047 | B1* | 7/2012 | Soghoian et al. ............... 726/22 |
| 8,608,487 | B2* | 12/2013 | Huie et al. ..................... 434/433 |
| 2007/0107053 | A1* | 5/2007 | Shraim et al. ................... 726/22 |
| 2007/0136806 | A1* | 6/2007 | Berman .......................... 726/22 |
| 2007/0245422 | A1 | 10/2007 | Hwang et al. |
| 2007/0250618 | A1* | 10/2007 | Hammond .................... 709/224 |
| 2007/0294352 | A1* | 12/2007 | Shraim et al. ................. 709/206 |
| 2008/0037791 | A1 | 2/2008 | Jakobsson |
| 2009/0089859 | A1 | 4/2009 | Cook et al. |
| 2009/0144308 | A1 | 6/2009 | Huie et al. |
| 2009/0265430 | A1* | 10/2009 | Bechtel et al. ................ 709/205 |
| 2009/0320137 | A1 | 12/2009 | White et al. |
| 2011/0055922 | A1 | 3/2011 | Cohen et al. |
| 2011/0246634 | A1* | 10/2011 | Liu et al. ........................ 709/223 |
| 2012/0023566 | A1* | 1/2012 | Waterson et al. ................. 726/9 |

OTHER PUBLICATIONS

"A video game for cyber security training and awareness," Cone, Benjamin D., et al., Department of Computer Science, Center for Information Systems Security Studies and Research, Naval Post Graduate School, Computers and Security 26, 2007, pp. 63-72.*

"Phishing for user security awareness," Dodge Jr., Ronald C., et al., Department of Electrical Engineering and Computer Science, U.S. Military Academy, Computer and Security 26, 2007, pp. 73-80.*

International Search Report (PCT/ISA/210) and Written Opinion of the International Searching Authority (PCT/OSA/237) dated May 24, 2012, issued in corresponding International application No. PCT/US2011/061002.

Alnajim, Abdullah, et al., "An Anti-Phishing Approach that Uses Training Intervention for Phishing Websites Detection," *2009 Sixth International Conference on Information Technology: New Generations*, 2009, pp. 405-410, IEEE, USA.

Toolan, Fergus, et al., "Feature Selection for Spam and Phishing Detection," *2010 eCrime Researchers Summit*, 2010, pp. 1-12, IEEE, USA.

Fette, Ian, et al., "Learning to Detect Phishing Emails," *Carnegie Mellon Cyber Laboratory Technical Report CMU-CYLAB-06-012*, Jun. 2006, pp. 1-12, Carnegie Mellon University, PA, USA.

Soni, Pravin, et al., "A Phishing Analysis of Web Based Systems," *ICCCS'11* Feb. 12-14, 2011, Rourkela, Odisha, India, 2011, pp. 527-530, ACM, USA.

Alnajim, A., et al., "An Approach to the Implementation of the Anti-Phishing Tool for Phishing Websites Detection," *International Conference on Intelligent Networking and Collaborative Systems*, 2009, p. 105-112, IEEE, USA.

He, Mingxing, et al., "An efficient phishing webpage detector," *Expert Systems with Applications*, 2011, pp. 12018-12027, vol. 38, Elsevier Ltd., UK.

Zhang, Yue, et al., "CANTINA: A Content-Based Approach to Detecting Phishing Web Sites," *Proceedings of the 16th International Conference on World Wide Web*, May 8-12, 2007, Banff, Alberta, Canada, May 2007, pp. 639-648, ACM, USA.

Wenyin, Liu, et al., "Detection of Phishing Webpages based on Visual Similarity," *14th International Conference on World Wide Web*, May 10-14, 2005, Chiba, Japan, pp. 1060-1061, ACM, USA.

Parno, Bryan, et al., "Phoolproof Phishing Prevention," *CyLab Carnegie Mellon University*, Dec. 3, 2005, 16 pages, Carnegie Mellon University, PA, USA.

Dhamija, Rachna, et al., "The Battle Against Phishing: Dynamic Security Skins," *Symposium on Usable Privacy and Security (SOUPS) 2005*, Jul. 6-8, 2005, Pittsburgh, PA, USA, 12 pages.

Huang, Chun-Ying, et al., "Using one-time passwords to prevent password phishing attacks," *Journal of Network and Computer Applications*, 2011, pp. 1-10, Elsevier B.V., NL.

Jackson, Collin, et al., "An Evaluation of Extended Validation and Picture-in-Picture Phishing Attacks," *Financial Cryptography and Data Security*, 2007, 13 pages, Springer-Verlag, DE.

Kang, Le, et al., "CAPTCHA Phishing: A Practical Attack on Human Interaction Proofing," *Inscrypt 2009*, LNCS 6151, 2010, pp. 411-425, Springer-Verlag, DE.

Dazeley, Richard, et al, "Consensus Clustering and Supervised Classification for Profiling Phishing Emails in Internet Commerce Security," *PKAW 2010, LNAI 6232*, 2010, pp. 235-246, Springer-Verlag, DE.

Jakobsson, Markus, "Modeling and Preventing Phishing Attacks," *Lecture Notes in Computer Science*, Indiana University at Bloomington, 2005, pp. 1-19, Bloomington, IN.

Dhamija, Rachna, et al., "Why Phishing Works," *Proceeding of CHI-2006: Conference on Human Factors in Computing Systems*, Apr. 2006, 10 pages.

Wu, Min, et al., "Do Security Toolbars Actually Prevent Phishing Attacks?," *CHI 2006*, Apr. 22-27, 2006, Montréal, Québec, Canada, 2006, 10 pages, ACM, USA.

Zhang, Yue, et al., "Phinding Phish: Evaluating Anti-Phishing Tools," *Proceedings of the 14th Annual Network and Distributed System Security Symposium (NDSS 2007)*, 2007, 16 pages.

Egelman, Serge, et al., "You've Been Warned: An Empirical Study of the Effectiveness of Web Browser Phishing Warnings," *CHI 2008*, Apr. 5-10, 2008, Florence, Italy, 2008, 10 pages, ACM, USA.

Downs, Julie, et al., "Decision Strategies and Susceptibility to Phishing," *Symposium on Usable Privacy and Security (SOUPS)*, Jul. 12-14, 2006, Pittsburgh, PA, USA, 2006, 12 pages.

Wright, Ryan, et al., "The Influence of Experiential and Dispositional Factors in Phishing: An Investigation of the Deceived," *Journal of Management Information Systems*, Summer 2010, pp. 273-303, vol. 27, No. 1, M.E. Sharpe, Inc., USA.

Sheng, Steve, et al., "Who Falls for Phish? A Demographic Analysis of Phishing Susceptibility and Effectiveness of Interventions," *CHI 2010*, Apr. 10-15, 2010, Atlanta, Georgia, USA, 2010, 10 pages, ACM, USA.

Vishwanath, Arun, et al., "Why do people get phished? Testing individual difference in phishing vulnerability within an integrated, information processing model," *Decision Support Systems*, 2011, pp. 576-586, vol. 51, Elsevier B.V., NL.

Alnajim, Abdullah, et al., "An Evaluation of Users' Anti-Phishing Knowledge Retention," *2009 International Conference on Information Management and Engineering*, 2009, pp. 210-214, IEEE, USA.

Sheng, Steve, et al., "Anti-Phishing Phil: The Design and Evaluation of a Game That Teaches People Not to Fall for Phish," *Symposium on Usable Privacy and Security (SOUPS)* 2007, Jul. 18-20, 2007, Pittsburgh, PA, USA, 2007, 12 pages.

Kumaraguru, Ponnurangam, et al., "Protecting People from Phishing: The Design and Evaluation of an Embedded Training Email System," *Proceeding of the SIGCHI Conference on Human Factors in Computing Systems*, Apr. 2007, pp. 1-10, ACM, USA.

Blom, Elma, et al., "Dummy auxiliaries in child and adult second language acquisition of Dutch," *Lingua*, 2011, pp. 906-919, vol. 121, Elsevier B.V., NL.

Radford, Andrew, et al., "On the Acquisition of Universal and Parameterised Goal Accessibility Constraints by Japanese Learners of English," *Essex Research Reports in Linguistics*, Mar. 2011, 46 pages (cover and second page, and pp. 1-44), vol. 60, No. 5, University of Essex, UK.

Dominiguez, Laura, et al., "Testing the Predictions of the Feature Assembly Hypothesis Evidence from the L2 Acquisition of Spanish Aspect Morphology," *Proceedings of the Boston University Conference on Language Development*, 2011, 14 pages, vol. 35, Cascadilla Press, MA, USA.

Bliton, Daniel, et al., "Unannounced Phishing Exercises and Targeted Training: Results and Lessons Learned," *Interservice/Industry Training, Simulation, and Education Conference (I/ITSEC)*, 2011, pp. 1-11, Paper No. 11342, I/ITSEC, USA.

Adams, Elizabeth, et al., "Brief Overview: Mandatory Training—A Systematic Review of Research and Trends in Learning Organizations," *Veterans Health Administration Office of Patient Care Services Technology Assessment Program • TAP Brief Overview*, Mar.

(56) References Cited

OTHER PUBLICATIONS 2010, 23 pages (cover page, pp. i-iii, and pp. 1-19), VA Technology Assessment Program, Boston, MA, USA.

Ferguson, Aaron J., "Fostering E-Mail Security Awareness: The West Point Carronade," *Educause Quarterly*, 2005, pp. 54-57, vol. 28, No. 1, Educause Online Publication, http://www.educause.edu/eq.

Hidi, Suzanne, et al., "Strategies for increasing text-based interest and students' recall of expository texts," *Reading Research Quarterly*, Fall 1988, pp. 465-483, XXIII/4, International Reading Association, Delaware, USA.

Klevinsky, T. J., et al., Chapter 3—Penetration for Hire, *Hack I.T.— Security Through Penetration Testing*, 2002, pp. 25-27, Addison-Wesley Professional, Pearson Education Ltd, USA.

Kumaraguru, Ponnurangam, et al., "School of Phish: A Real-World Evaluation of Anti-Phishing Training, Mar. 9, 2009, CMU-CyLab-09-02," 2009, Carnegie Mellon University, Pittsburgh, PA, USA.

Sadoski, Mark, "Resolving the Effects of Concreteness on Interest, Comprehension, and Learning Important Ideas From Text," *Educational Psychology Review*, 2001, pp. 263-281, vol. 13, No. 3, Plenum Publishing Corporation, NY, USA.

\* cited by examiner

SYSTEMS AND METHODS FOR IDENTIFYING AND MITIGATING INFORMATION SECURITY RISKS

CROSS-REFERENCE TO RELATED APPLICATIONS

The present application claims the benefit of U.S. Provisional Appl. No. 61/414,142 entitled "Phishing Awareness Training (PAT) Distinction Components," filed Nov. 16, 2010, and U.S. Provisional Appl. No. 61/502,678 entitled "Phishing Awareness Training (PAT) Distinction Components," filed Jun. 29, 2011. These prior applications are incorporated by reference herein in their entireties.

BACKGROUND OF THE DISCLOSURE

1. Field of the Disclosure

The field of the disclosure relates generally to information security training, and, more particularly, to phishing awareness training.

2. Description of the Related Art

Social engineering attacks, such as phishing, constitute a common threat to organization's information technology (IT) enterprise systems and data. Phishing attacks target individual users and seek to exploit them as the weakest link in the information security chain.

Conventional information security training consists of static presentations or test events that are exercised on a periodic basis (i.e., annually, quarterly, or monthly). However, given that attack methodologies are constantly evolving, information security threats quickly outpace the level of conventional training. This is especially true in the social engineering attack context. Accordingly, what is needed is more sophisticated information security training to better protect organizations and their data from these ever-evolving threats.

Traditional training techniques, such as annual data security training, are not targeted to susceptible users and fail to provide a consistent level of user awareness of security threats such as social engineering attacks. Accordingly, what is needed are systems and methods for providing a consistent level of user awareness and exploitation of a "teachable moment" operand conditioning in order to provide focused training for susceptible users.

SUMMARY OF THE DISCLOSURE

The present disclosure is directed to exemplary methods, exemplary apparatus and exemplary systems that provide phishing awareness training to targeted users.

Based on service-oriented design, exemplary embodiments of the present disclosure provide awareness on evolving threats as they are detected, rather than waiting for annual or quarterly training efforts. Additionally, exemplary embodiments disclosed herein provide tailored exercises which can be geared towards specific staff, such as new hires or contractors. Metrics from exercises can be tracked over time to determine the effectiveness of training across various objectives and organizational demographics as well.

Additionally, tailored exercises can be geared towards specific, targeted user accounts, such as, but not limited to, user accounts associated with new hires, contractors, or users who have demonstrated a propensity for falling victim to social engineering attacks, either simulated or real, in the past.

Techniques for Sustained Testing and Awareness Refresh against Phishing threats (STAR*Phish™) disclosed herein are distinguishable from conventional techniques in several ways. One key premise of the systems and methods disclosed herein is to focus on exploiting a "teachable moment" to target training towards susceptible users, which is an emerging concept that the training systems described herein are built around. In accordance with an exemplary embodiment, users are trained in live exercises coordinated with incident response personnel, and those users who fall victim are immediately transferred to a training component. According to an exemplary embodiment, STAR*Phish™ includes two components: a Phishing Metrics Tool (PMT), and a Phishing Training Tool (PTT).

While training provides an engaging environment to learn about various attack methodologies used in phishing, it is also tailored to reinforce correct reporting procedures. In the course of training, users are shown the correct and safe way to report phishing, which goes beyond what most available training resources currently provide. While providing information on the threat, STAR*Phish™ also provides information on responding to the threat within the environment the user operates in.

This response process is customized to client policies and procedures, rather than an ambiguous response approach that might not be relevant for all users. STAR*Phish™ takes a unique approach from an architectural standpoint as well, by providing a dual-domain system. According to an embodiment, the PMT is hosted on an external, un-trusted domain which lends credibility to the security threat for all responses. According to this example embodiment, users are actually clicking on links and being directed to websites that are external to their organization's environment, rather than accessing a simulated capture site inside their own, trusted environment. However, the PMT directs users to training which is located on a trusted internal site associated with their organization. In this way, the "bait" provides a high level of realism, but once the response is captured users are provided training on a trusted domain. This increases the likelihood that users will continue with their training requirement, rather than assuming the training is part of a phishing attack.

The PMT provides several unique capabilities. First, the phishing exercises allow phishing e-mails to be customized, including a wide variety of attacks such as attachments and full credential captures. The responses, and the "teachable moment", can be caught at varying stages depending on the objectives of the exercise. For example, users can be directed to training immediately after clicking a link, or can be allowed to enter credentials or run embedded code before being transferred to training. Additionally, the metrics being tracked by the PMT are extremely diverse and not currently provided in such depth by conventional training systems. The PMT tracks response types, shows response graphs based on IP and target email, illustrates geographic distributions of responses, and even uses heuristics to determine social network maps and potential administrative hosts. The PMT also has an agent-based design that can be used to run distributed phishing exercises according to client requirements. Agents can be used to distribute phishing e-mails, track responses, and update a central collection agent that tracks the metrics.

Finally, STAR*Phish™ is modular, and can be tailored to meet specific client needs. If requested, the PMT can be used to run stand-alone exercises as part of penetration tests, or the PTT can be implemented to provide a stand-alone training resource.

In an embodiment, a computer-implemented method for training disclosed herein provides distinguishing features not found in conventional training systems. In accordance with an exemplary embodiment, there are two ways that users can take the training: voluntarily or as part of a mandatory requirement. Voluntary training is promoted through social media, including communities of practice and demonstrations. In accordance with an exemplary embodiment, users are provided with an ADOBE™ Flash-based training simulation that provides a virtual e-mail client interface, mimicking what they are likely to use in normal operations. In an alternative exemplary embodiment, the training simulation is ADOBE™ Flex-based. In yet another alternative exemplary embodiment, the training simulation is implemented in the HTML5 language.

If users have been directed to the training as a result of responding to a phishing e-mail, they are immediately trained on the e-mail that they were targeted with, capitalizing on the threat to which they have responded. Additionally, the mandatory training component is tracked as part of the live exercises, and users are sent notifications of their training requirement. This notification system, incorporated into the PMT, prevents users from simply ignoring poor security practices.

The present disclosure is directed to exemplary systems, architectures, methods, and non-transitory computer readable storage media for implementing STAR*Phish™.

Further features and advantages of the present disclosure, as well as the structure and operation of various embodiments thereof, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING FIGURES

The accompanying drawings, which are incorporated herein and form part of the specification, illustrate exemplary embodiments of the present disclosure and, together with the description, further serve to explain principles, aspects and features of the present disclosure. The exemplary embodiments are best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures:

Figure 3:
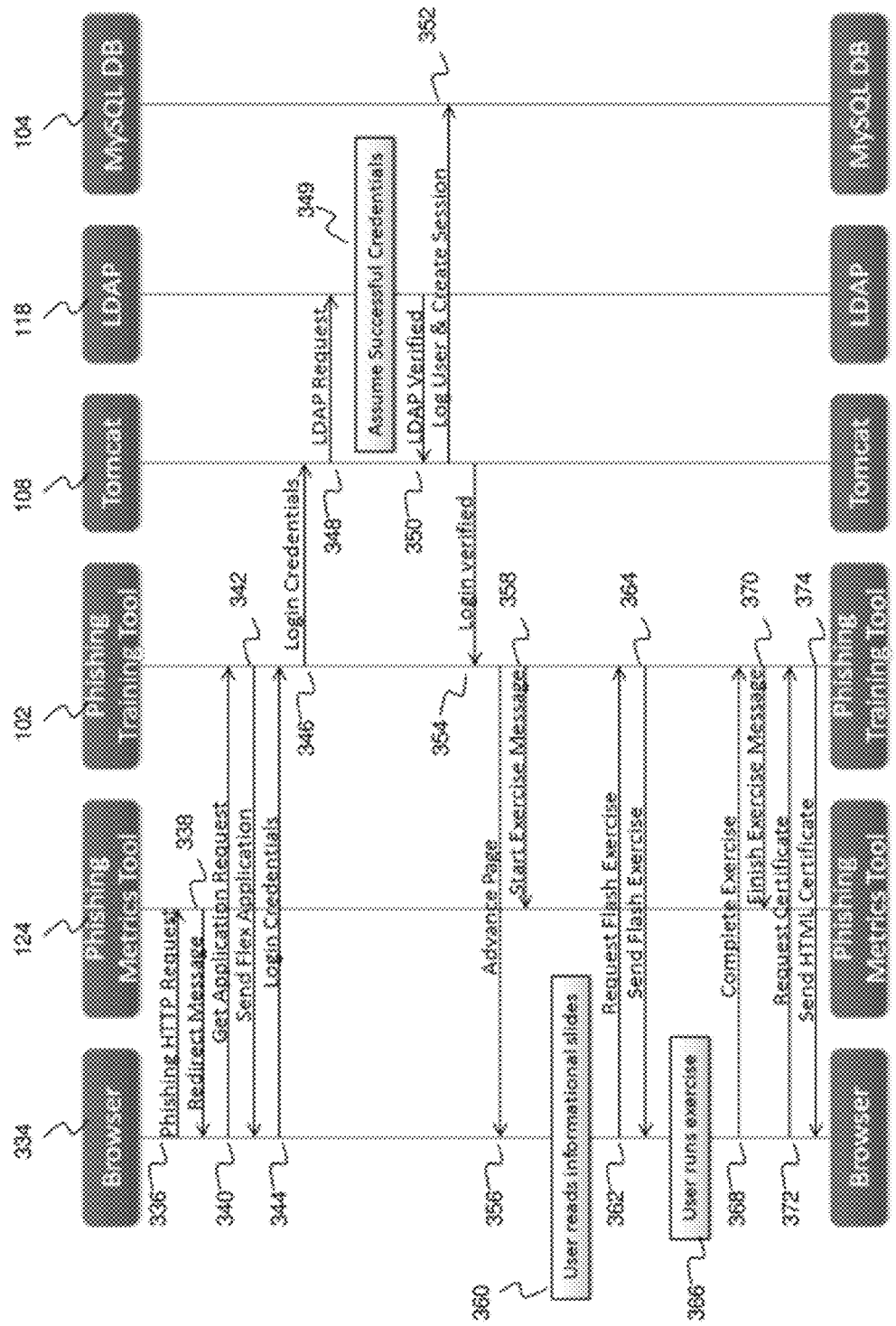
Figure 4:
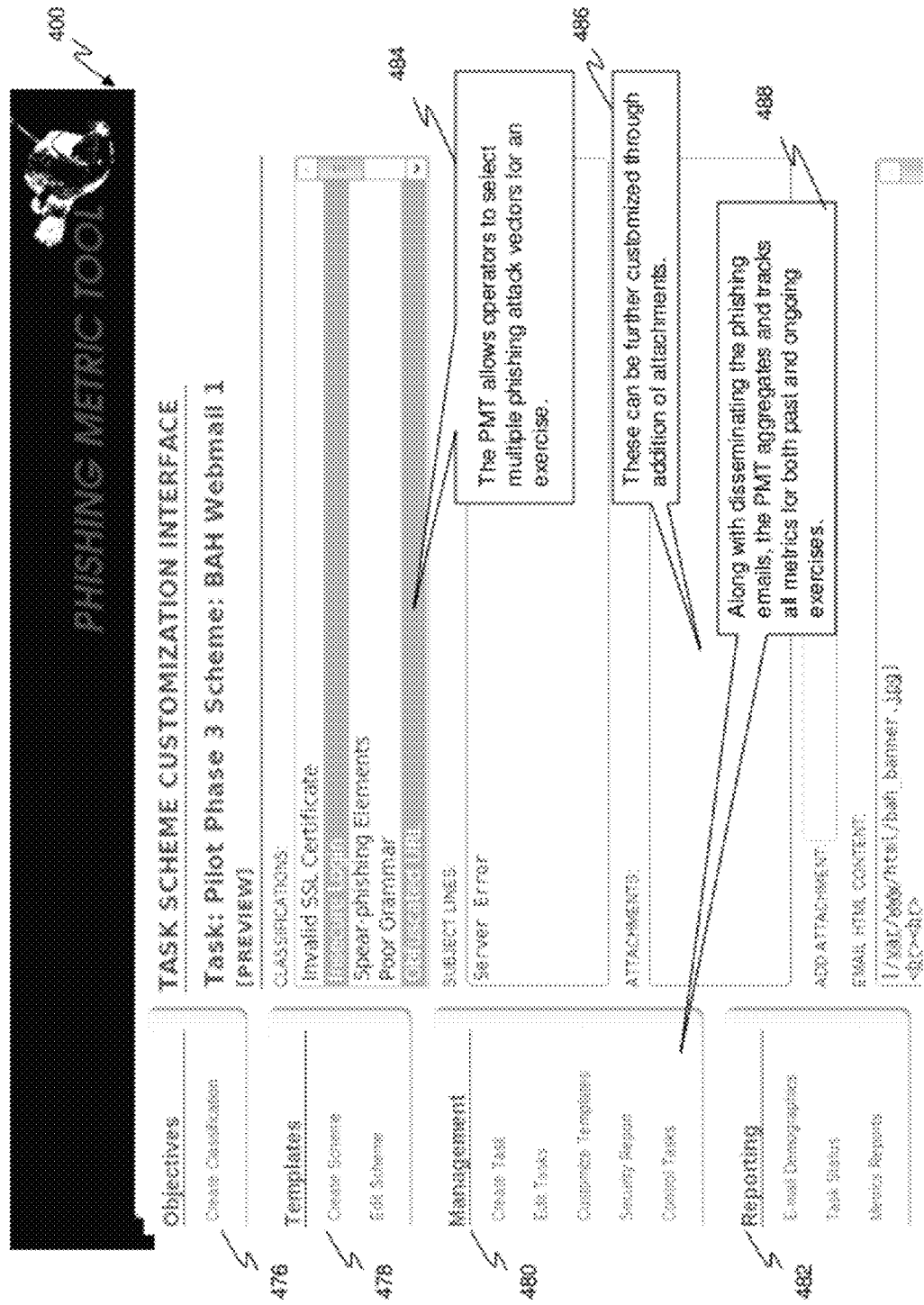
Figure 5:
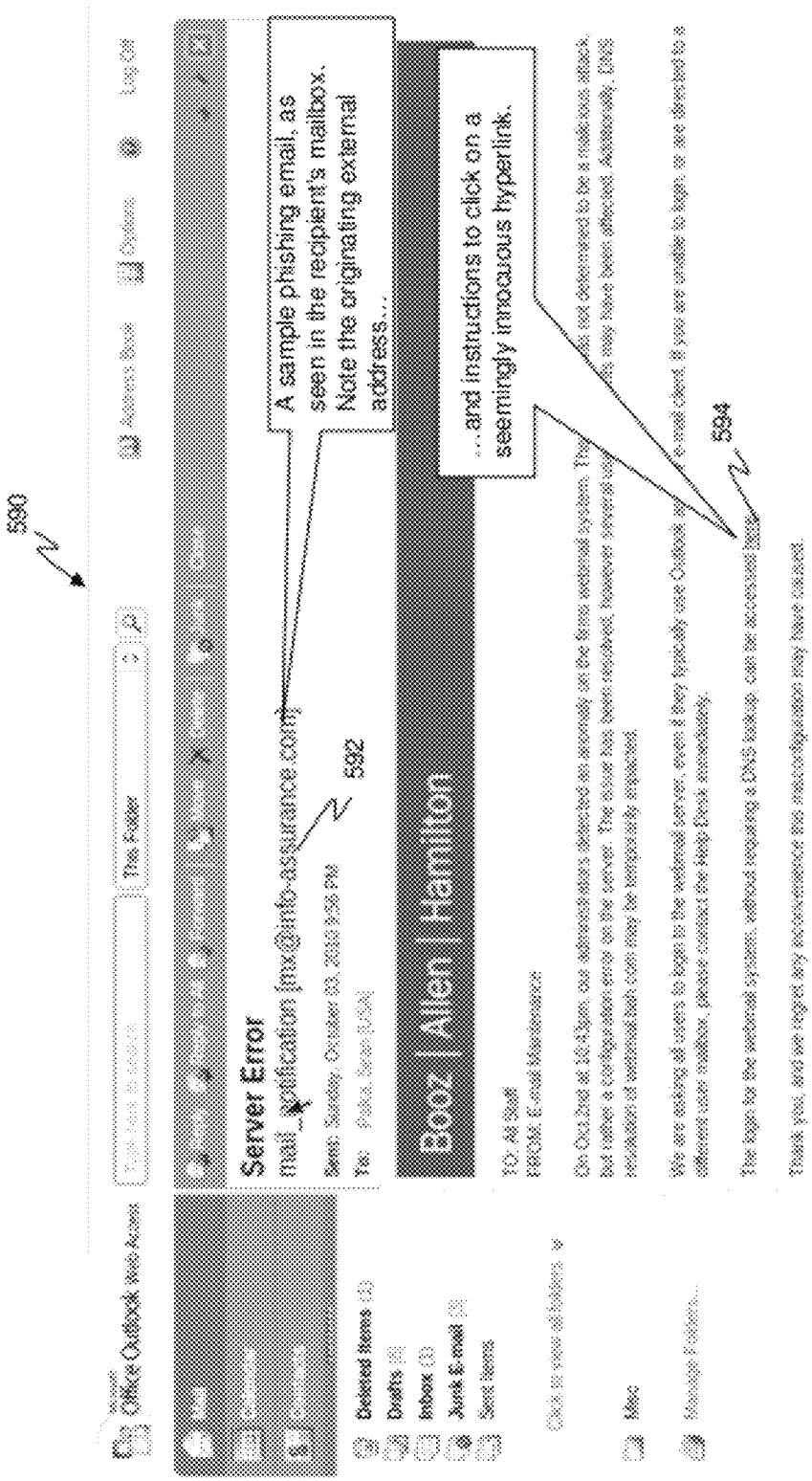
Figure 6:
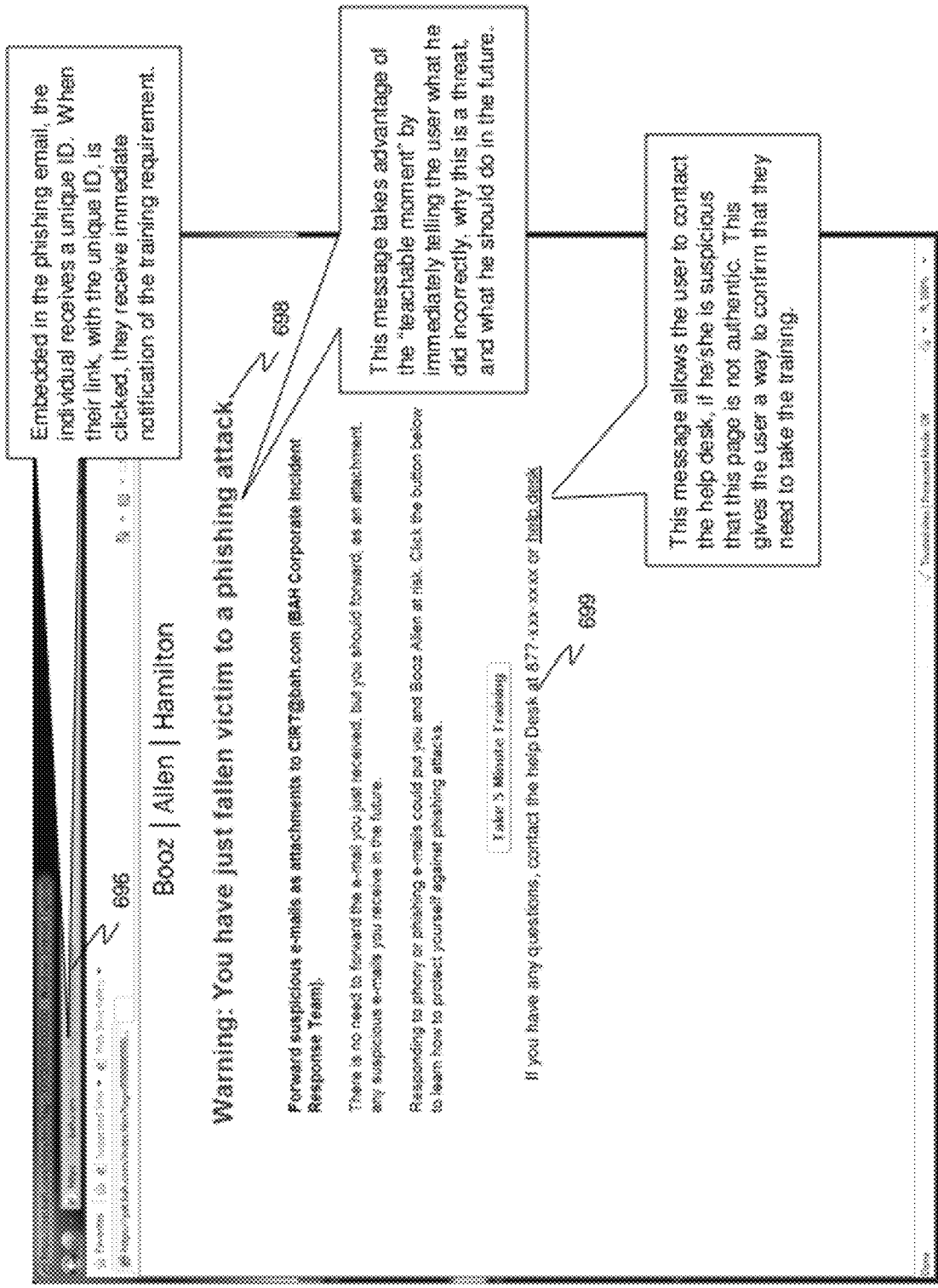
Figure 13:
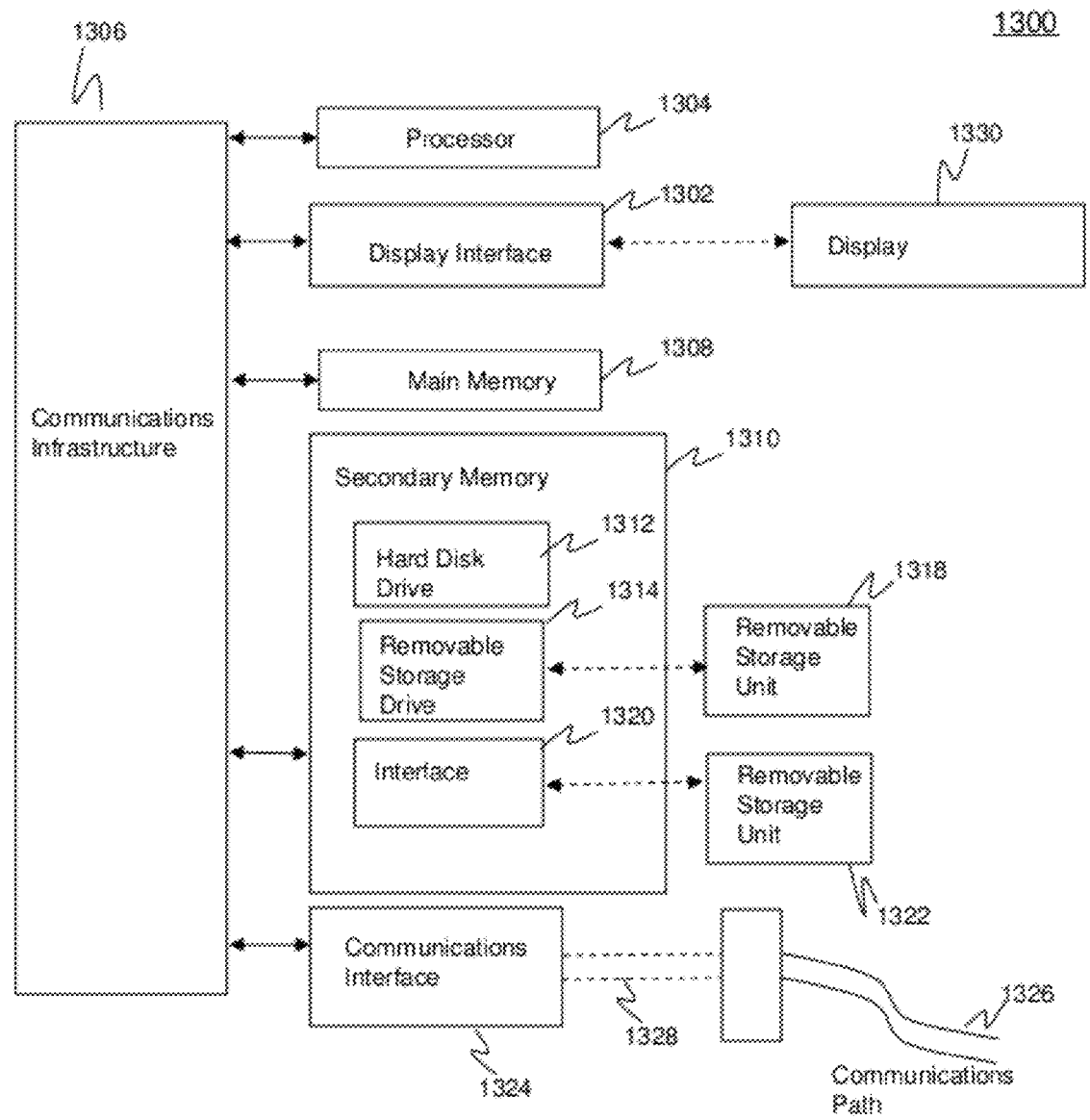

FIG. 3 provides a Message Sequence Chart illustrating operational steps by which information security risks are identified and mitigated, in accordance with exemplary embodiments of the present disclosure;

FIG. 4 depicts a server-side administrative graphical user interface (GUI) for a phishing metric tool (PMT), according to an exemplary embodiment of the present disclosure;

FIGS. 5-6 depict a GUI for an email client to display and receive notification of susceptibility to a phishing attack, according to an exemplary embodiment of the present disclosure;

FIGS. 7-12 depict a GUI for displaying and completing a received phishing training exercise, according to an exemplary embodiment of the present disclosure;

FIG. 13 is a diagram of an exemplary computer system in which embodiments of the present disclosure can be implemented.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present disclosure relates to systems and methods for providing sustained testing and awareness against social engineering threats to information security, such as phishing threats. In particular, the systems and methods provide sustained user awareness training mechanism in a continuous, ongoing fashion and within a Web 2.0 training environment with live phishing exercises. In contrast to traditional periodic (e.g., annual) training, the systems and methods of the present disclosure provide a consistent level of user awareness and exploit "teachable moment" operand conditioning in order to provide focused training for users susceptible to social engineering attacks. Based on its service-oriented design, an exemplary system is able to provide awareness on evolving threats as they are detected, instead of waiting for an annual or quarterly training course. Additionally, tailored exercises delivered by the system can be geared towards specific staff, such as new hires or contractors. Metrics from the exercises can be tracked over time to determine effectiveness of training across various objectives and organizational demographics as well.

Embodiments of the systems and methods disclosed herein provide focused phishing awareness training wherein "teachable moments" are exploited so as to provide focused training for users that have demonstrated susceptibility to phishing. The systems and methods also adapt to evolving threats by including live exercises that are performed regularly with escalated complexity based on the level of user awareness demonstrated in previously-completed exercises. In embodiments, metrics from the exercises are tracked over time to determine the effectiveness of training across various objectives and organizational demographics. Embodiments also include customized training including components that can be implemented separately or in tandem to meet an organization's specific needs by merging testing and training components.

According to embodiments disclosed herein, live training exercises are coordinated using the PMT to allow testers to develop and send convincing, realistic phishing e-mail messages, track responses in real-time, and analyze and track metrics such as, but not limited to, response rates. As user responses are tracked by the PMT, teachable moments are exploited to train users while actions and perceptions are still fresh. In an embodiment, individual exercise components can be run without training to establish base metrics. Alternatively, exercise components can be included as part of an organization's penetration testing, which analyzes the impact of successful phishing attacks.

The methods and systems disclosed herein offer a training simulation that provides an engaging and informative environment that walks users through identification of suspicious e-mail messages and reinforces organizational reporting procedures. Embodiments of the training require uses to be fully engaged so that they are not merely clicking through and acknowledging a pre-determined sequence of screens. The training can be offered as a stand-alone component as well as a voluntary training resource. Through sustained use of the training, as opposed to traditional periodic training offered at set times, evolving threats are addressed and users are provided with consistent training opportunities that maintain user awareness at all times.

While the present disclosure is described herein with reference to illustrative embodiments for particular applications, it is to be understood that the invention is not limited thereto. Those skilled in the art with access to the teachings provided herein will recognize additional modifications, applications, and embodiments within the scope thereof and additional fields in which the invention would be of significant utility.

Unless specifically stated differently, in an embodiment, a user is interchangeably used herein to identify a human user, a software agent, or a group of users and/or software agents. Besides a human user who may be susceptible to information security breaches and phishing threats, a software application or agent sometimes can fall prey to information security attacks. Accordingly, unless specifically stated, the terms "user" and "user account" as used herein do not necessarily pertain to a human being.

Figure 1:
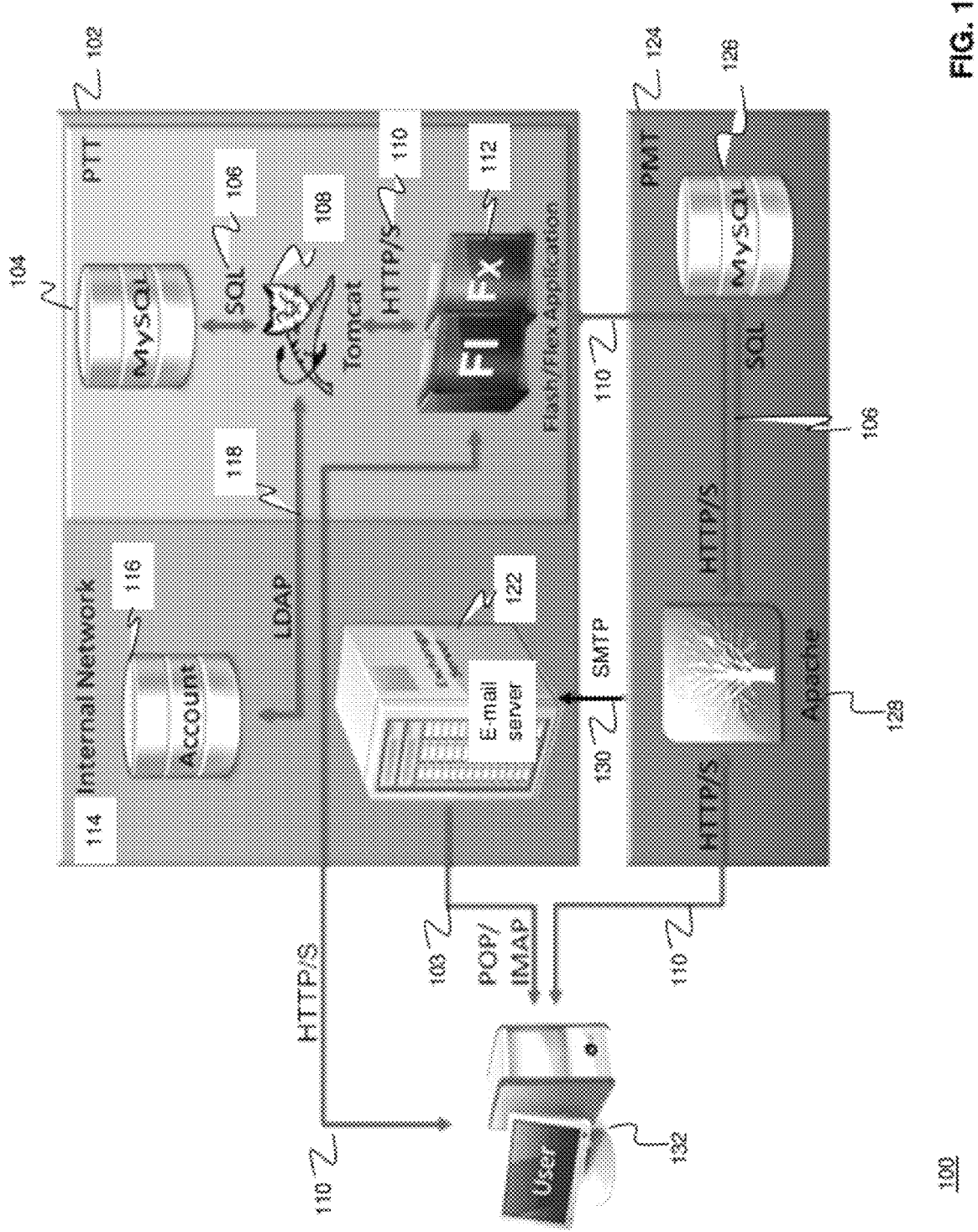
FIG. 1 illustrates a modular view of an enterprise environment for identifying and mitigating information security risks, in accordance with an exemplary embodiment of the present disclosure.

FIG. 1 depicts an enterprise system 100, which allows a user account 132 to connect to web server 128 via Hypertext Transfer Protocol (HTTP) and Hypertext Transfer Protocol Secure (HTTPS) requests 110, in accordance with an embodiment of the present disclosure. While this embodiment is described chiefly in terms of a connection between a user account 132 from a client machine and web server 128, it is applicable to other servers such as e-mail server 122. Although web server 128 is depicted as an Apache web server, as will be appreciated by persons skilled in the relevant art, web server 128 may be implemented as another Hypertext Transfer Protocol (HTTP) web server. Similarly, while servlet 108 is depicted in FIG. 1 as an Apache Tomcat servlet, those skilled in the relevant art will appreciate that servlet 108 is not limited to being implemented as a Tomcat servlet.

System 100 utilizes a unique combination of training tied to a phishing exercise (e.g., a simulated attack via email messages). Phishing exercises, such as the ADOBE™ Flex and Flash training application 112 depicted in FIG. 1, utilize a unique identifier to track responses to specific crafted emails. The identifier allows reliable metrics, such as, but not limited to, geographic location, tracking, as well as association of user accounts 132 and their responses to specific exercises. In one embodiment, the identifier is a 16 digit number that forms part of a uniform resource locator (URL) sent as an HTTP request redirect. In another embodiment, the identifier may be a parameter passed with email messages and HTTP redirect messages.

PTT 102/PMT 124 communications include the unique identifier in order to enable tracking of logins for user accounts 132 and training status. An update process allows PTT 102 to retrieve specific exercise e-mails from PMT 124 and include these in the training for targeted user accounts 132.

System 100 has multiple components, each with a highly specialized function. The Phishing Training Tool (PTT) 102 is a data-driven training interface that is used to train susceptible users. In an embodiment, the Phishing Metrics Tool (PMT) 124 is a web-based content development and management interface that is used to generate phishing e-mails, such as Post Office Protocol (POP) and Internet message access protocol (IMAP) e-mail messages 103, and track responses.

Deployment of system 100 for an organization entails customizing the components depicted in FIG. 1 to meet organizational training directives and aesthetics. Additionally, while no sensitive data is stored in system 100, individual instances of PMT 124 and PTT 102 are created to support a given organization, allowing for segregation of response statistics.

In order to provide realistic phishing exercises, in certain embodiments some aspect of the phishing exercise architecture for system 100 may reside on an untrusted domain external to the internal network 114 of the organization. For example, PMT 124, its PMT database server 126, and its web server 128, may reside on an untrusted domain external to internal network 114 and PTT database server 104 and e-mail server 122, which each reside on a trusted domain. As described below with reference to FIG. 2B, the use of Distributed Phishing Agents (DPAs), which can be registered on an untrusted domain for components of PMT 124, can lend additional realism to the training exercise by making web server 128 and PMT database server 126 appear to be truly external to internal network 114 and the user's trusted domain.

Although PTT and PMT database servers 104 and 126 are shown in the exemplary embodiment of FIG. 1 as MySQL servers, as will be appreciated by persons skilled in the relevant art, database servers 104 and 126 may also host other relational database management systems (RDBMSs), such as, but not limited to, Oracle™ database servers, servers hosting MICROSOFT™ SQL Server databases, and Sybase™ database servers. Similarly, while exemplary e-mail server 122 is shown as a MICROSOFT™ Exchange server, those skilled in the relevant art will appreciate that the e-mail server 122 may also be implemented as other e-mail servers, such as, but not limited a Lotus Domino server, a Lotus Notes server, and a Novell GroupWise.

With continued reference to FIG. 1, the functionality of the components of system 100 are described below. The communications and relationships between the components of system 100 are described within the context of a computer-implemented method for providing sustained testing and awareness refresh training against social engineering threats to information security. Although the computer implemented method is described with reference to interactive computer-based training that improves an organization's awareness of phishing attacks, it is understood that the method can be applied to identifying and mitigating threats from other social engineering attacks. The steps of the computer implemented method do not necessarily have to occur in the order described below. As noted below, some of the steps are optional.

The method begins when target e-mail addresses for user accounts 132 are respectively assigned schemes and unique identifiers by PMT 124. In an embodiment, structured query language (SQL) statements 106 are sent between PMT database server 126 and web server 128 within PMT 124 to accomplish the assignment of schemes and unique identifiers.

Next, e-mail messages are delivered to user accounts 132 with respective unique identifiers. As shown in the exemplary embodiment of FIG. 1, this may be accomplished by sending Simple Mail Transfer Protocol (SMTP) requests 130 from web server 128 to e-mail server 122. The e-mail messages are then downloaded by the user accounts 132. In an embodiment, this may be done via POP/IMAP e-mail messages 103 sent via e-mail server 122.

Then, a vulnerable user logged into a user account 132 supplies a response to PMT 124 via an HTTP/HTTPS request 110 to web server 128. The HTTP/HTTPS request 110 includes the unique identifier discussed above. At this point, PMT 124 updates a status for the responding user account 132, logs a training requirement, and tracks response metrics for user account 132. As illustrated in FIG. 1, the status update, logging and metrics tracking can be accomplished by sending SQL statements 106 between PMT database server 126 and web server 128.

Next, the user associated with user account 132 is redirected to PTT 102 in real-time immediately after capturing the response, thus exploiting a "teachable moment" while the user's susceptibility to the simulated phishing attack is fresh in his mind. This re-direct can be accomplished by sending an HTTP/HTTPS redirect request 110 from to user account 132 from training application 112 within PTT 102. Although training application 112 is depicted in as an ADOBE™ Flex or Flash application, it is understood that training application 112 can be implemented in other development environments and languages, such as, but not limited to, HTML5.

As an optional step, user account 132 may be directed to PTT 102 via another HTTP/HTTPS request 110 from the training application 112 after a reminder notification has been sent. User account 132 may also be sent an HTTP/HTTPS response 110 from the training application 112 via web server 128 for voluntary training. In another optional step, user credentials for user account 132 are sent via a Lightweight Directory Access Protocol (LDAP) request 118 from servlet 108 to account database 116 within internal network 114. These user credentials can then be validated, providing confirmation of the identity of a user account 132 respondent. Next, PTT 102 sends notification of respondent identity and identifier to PMT 124 via an HTTP/HTTPS response 110.

During the execution of training application 112 by the user associated with user account 132, PMT 124 iteratively updates the training status and returns training exercise e-mail contents as applicable. According to one embodiment, this can be done by sending SQL statements 106 between PMT database server 126 and web server 128.

As an optional step, PMT 124 may send a reminder notification in response to determining that a user associated with a user account 132 does not complete the training within a designated time period. This notification can be sent via POP/IMAP e-mail messages 103 from e-mail server 122 to user account 132. In embodiments, the designated time period is a tunable parameter that can be adjusted by a training or system administrator of internal network 114. For example, the time period may be set to a predetermined number of hours, days, or weeks, as deemed necessary by the administrator.

Upon determining that the training has been completed by the user associated with user account 132, PTT 102 sends a completion notification. This notification can be sent as an HTTP/HTTPS response 110 between training application 112 and web server 128. In one embodiment, this step may additionally include generation and display of a completion certificate by training application 112. According to embodiments, the completion notification and/or certificate can be sent to user account 132 and an administrator for internal network 114.

Lastly, PMT 124 updates the status for user account 132 and sends a completion e-mail message to user account 132.

As shown in FIG. 1, this completion e-mail message can be sent as an SMTP request 130 from web server 128 via e-mail server 122.

Figure 2A:
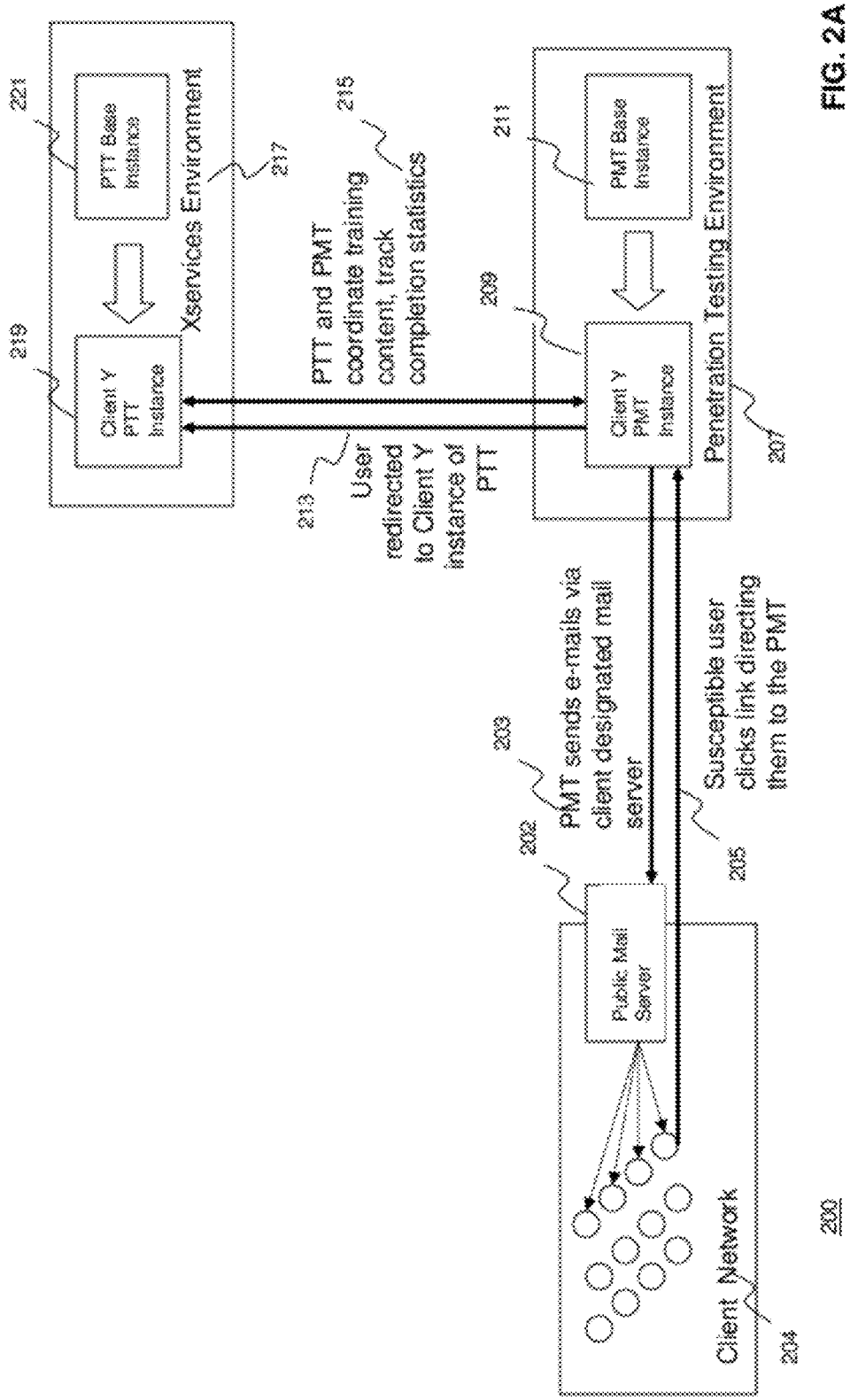
FIG. 2A depicts a process diagram for identifying and mitigating information security risks in an architecture without distributed phishing agents, in accordance with an exemplary embodiment of the present disclosure.
Figure 2B:
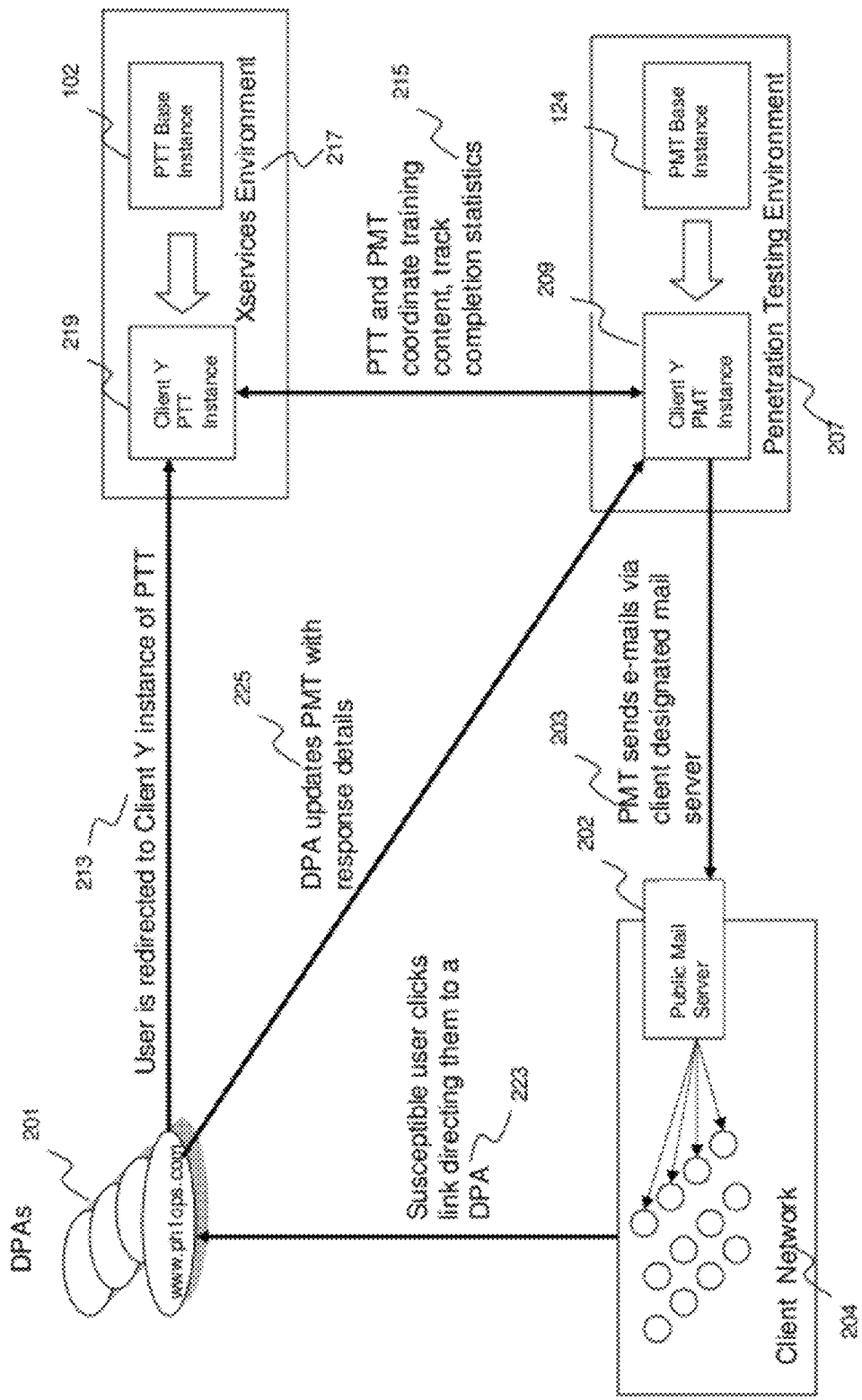
FIG. 2B depicts a process diagram for identifying and mitigating information security risks in an architecture with distributed phishing agents, in accordance with an exemplary embodiment of the present disclosure.

FIGS. 2A and 2B depict exemplary architectures and process diagrams for identifying and mitigating information security risks in an architecture without and with distributed phishing agents, respectively, in accordance with embodiments of the present disclosure. FIGS. 2A and 2B are described with continued reference to the embodiments illustrated in FIG. 1 However, FIGS. 2A and 2B are not limited to those embodiments.

As part of coordination tasks, an organization (i.e., "Client Y" in the exemplary embodiments of FIGS. 2A and 2B) in need of phishing awareness training may supply information about a valid e-mail server 122, such as public mail server 202, that can be used to send e-mails to user accounts 132 within client network 204.

In accordance with an embodiment, customized version of the base instance of PTT 102, such as the client Y PTT instance 219 depicted in FIG. 2A, is deployed in Xservices environment 217. This allows trusted communications by deploying valid Secure Sockets Layer (SSL) certificates, plus the reliability of a hosted environment like Xservices environment 217.

As shown in FIG. 2A, in architecture 200 without distributed phishing agents, an isolated instance of the base instance of PMT 124 is deployed as a client Y PMT instance 209 on Penetration Testing Environment 207. This allows simulated attacks without compromising internal security policies. This isolated instance is shown in FIG. 2A as Client Y PMT instance 209.

Client Y PMT instance 209 sends e-mail messages 203 to a client-designated mail server, such as public mail server 202. Next, a susceptible user associated with a user account 132 within client network 204 clicks on a simulated phishing link/URL, triggering an HTTP/HTTPS request 205 to client Y PMT instance 209. According to an embodiment, client network 204 may be internal network 114 described above with reference to FIG. 1.

At this point, user account 132 is redirected to Client Y PTT instance 219 via an HTTP/HTTPS redirect request 213. Next, client Y PTT instance 219 and client Y PMT instant 209 coordinate training content and track completion statistics. As illustrated in FIG. 2A and described with reference to FIG. 1 above, this coordination can be accomplished by sending HTTP/HTTPS requests and responses 215 between client Y PTT instance 219 and client Y PMT instant 209.

FIG. 2B depicts an architecture 210 and process diagram for identifying and mitigating information security risks in an architecture with distributed phishing agents, in accordance with an embodiment of the present disclosure.

Within architecture 210, Distributed Phishing Agents (DPA) 201 are registered domains with no traceable connection to the host organization or internal network 114, and serve as proxies for capturing responses. According to an embodiment, DPAs 201 are registered domains that act as proxies that redirect users to appropriate resources, allowing the exercises to use a variety of links and avoid altered responses based on recognition of target uniform resource locators (URLs).

As show in FIG. 2B, client Y PMT instance 209 sends e-mail messages 203 to a client-designated mail server, such as public mail server 202. Next, a susceptible user associated with a user account 132 within client network 204 clicks on a simulated phishing link/URL, triggering an HTTP/HTTPS request 223 to a DPA 201. According to an embodiment, client network 204 may be internal network 114 described above with reference to FIG. 1, but the DPAs 201 are external to client network 204.

Next, the user associated with user account 132 is redirected to client Y PTT instance 219 via an HTTP/HTTPS redirect 213 sent from the DPA 201 to client Y PTT instance 219. As shown in FIG. 2B, DPA 201 also updates client Y PMT instant 209 with response details 225 for user account 132.

At this point in the process, client Y PTT instance 219 and client Y PMT instant 209 coordinate training content, track completion statistics. As illustrated in FIG. 2B described above with reference to FIGS. 1 and 2A above, this coordination can be accomplished by sending HTTP/HTTPS requests and responses 215 between client Y PTT instance 219 and client Y PMT instant 209.

FIG. 3 is a message sequence chart illustrating a method 300 of sustained testing and awareness refresh against phishing threats in accordance with other exemplary embodiments.

FIG. 3 is described with continued reference to the embodiments illustrated in FIGS. 1, 2A and 2B. However, FIG. 3 is not limited to those embodiments.

Method 300 handles cases where a phishing HTTP request is sent from a browser session in response to a susceptible user clicking on a simulated phishing link. According to an embodiment, the browser session may be an Internet browser web-based e-mail client launched by a user associated with a user account 132 to read e-mail delivered by e-mail server 122.

Method 300 begins at step 336 where a phishing HTTP/HTTPS request is sent from browser 334 to PMT 124. As would understood by persons skilled in the relevant art, the method 300 can be applied to various Internet browsers, including, but not limited to, MICROSOFT™ Internet Explorer, Mozilla Firefox, GOOGLE™ Chrome, APPLE Safari, and OPERA™.

In step 338, a redirect message is sent from PMT 124 to browser 334 so that in step 340, an application request can be sent from browser 334 to PTT 102. The request sent in step 340 can be for any embodiment of training application 112 described above with reference to FIG. 1.

In step 342, training application 112 is sent from PTT 102 to browser 334. Although training application 112 is shown in FIG. 3 as an ADOBE™ Flex application, as described above with reference to FIG. 1 and step 340, in alternative embodiments, training application can be an ADOBE™ Flash application or an application developed in other environments/languages such as HTML5.

In steps 344-354, which are included in an optional login process within method 300, login credentials for user account 132 are sent and verified.

In step 344, login credentials for user account 132 are sent from browser 334 to PTT 102, which in turn forwards the credentials to servlet 108 in step 346. While servlet 108 is depicted in FIG. 3 as an Apache Tomcat servlet, those skilled in the relevant art will appreciate that servlet 108 is not limited to being implemented as a Tomcat servlet.

In step 348, an LDAP request 118 is sent by servlet 108 so that the credentials can be successfully verified in step 349. As described above with reference to FIG. 1, credential verification in this step may include checking the credentials against an account database 116 within internal network 114.

In step 350, an LDAP-verification status is sent to servlet 108 so that the user account 132 can be logged in and a user session can be created in step 352.

In step 354, an indication of the verified login is sent from servlet 108 to PTT 102.

In step 356, an advance page is sent from PTT 102 to browser 334. In an embodiment, this advance page indicates in the browser session that a training exercise is required.

In step 358, a start exercise message is sent from PTT 102 to PMT 124. According to an embodiment, the start exercise message includes a unique identifier uniquely identifying the user account 132 that needs to complete the exercise provided by training application 112.

In step 360, the user associated with user account 132 can review informational slides regarding the exercise, which are displayed by browser 334.

In step 362, a request for the exercise is sent from browser 334 to PTT 102. Although the exercise is shown as an ADOBE™ Flex-based exercise in FIG. 3, it is to be understood that the exercise can be ADOBE™ Flash-based or developed using other languages such as, but not limited to, HTML5.

In step 364, the exercise is sent from PTT 102 to browser 334 so that the user associated with user account 132 can run the exercise on browser 334 in step 366.

In step 368, upon completion of the exercise, a completion notification is sent from browser 334 to PTT 102 and in response, PTT 102 sends an exercise completion message to PMT 124 in step 370.

In step 372, the user associated with user account 132 can optionally send a request from browser 334 to PTT 102 so that PTT 102 can send an HTML completion certificate back to browser 334 in step 374.

FIGS. 4-12 depict example graphical user interfaces (GUIs) for displaying and information pertaining to sustained testing and awareness refresh against phishing threats. In an embodiment, a server side administrator application may include the exemplary interface illustrated in FIG. 4.

According to an embodiment, browser 334 may display the exemplary interface illustrated in FIGS. 5-12. FIGS. 4-12 are described with continued reference to the embodiments illustrated in FIGS. 1-3. However, FIGS. 5-12 are not limited to those embodiments. Throughout FIGS. 5-12, displays are shown with various hyperlinks, command regions, tabs, buttons, checkboxes, and data entry fields, which are used to initiate action, invoke routines, enter data, view data, or invoke other functionality, such as functionality of training application 112. For brevity, only the differences occurring within the figures, as compared to previous or subsequent ones of the figures, are described below.

FIG. 4 illustrates an exemplary GUI for viewing and editing task scheme information within a server side administrative interface, in accordance with an embodiment of the present disclosure. FIG. 4 illustrates a top-level administrative interface 400 for displaying and editing training settings associated with PMT 124. Administrative interface 400 is a server side administrative interface used to customize task schemes, such as the schemes described with reference to FIG. 1 above.

By clicking create classification link 476, an administrator for internal network 114 can create a classification for a training exercise. By selecting template links 478, the administrator can create and edit schemes. FIG. 4 also includes management links 480, which allow the administrator to create and edit training tasks in addition to customizing templates. Management links 480 also allow security reports to be viewed and edited and enable viewing and modification of control tasks.

Along with disseminating the phishing e-mail messages, PMT 124 can aggregate and track metrics for both past and ongoing exercises through use of control tasks link 488 within management links 480. Reporting links 482 within administrative interface 400 allow viewing of e-mail demographics, task status, and training metrics reports.

As shown in FIG. 4, classifications menu 484 for PMT 124 allows operators and administrators to select multiple phishing attack vectors for an exercise. Some exemplary attack vectors are provided in the exemplary classifications menu 484. However, it is to be understood that the list of attack vectors shown in FIG. 4 is not exhaustive. These attack vectors can be further customized through addition of attachments in attachments window 486.

FIG. 5 illustrates an exemplary web-based e-mail interface 590, which can be used by a user associated with user account 132 to retrieve POP/IMAP e-mail messages 103 from e-mail server 122. As shown in FIG. 5, a sample phishing e-mail message 592 can be displayed by e-mail interface 590 in the recipient's mailbox. The phishing e-mail message 592 displayed within e-mail interface 590 may include instructions to click on a seemingly innocuous phishing hyperlink 594.

Upon determining that a user has selected phishing hyperlink 594, the notification screen depicted in FIG. 6 can be displayed within browser 334. As shown in phishing URL 696 of FIG. 6, embedded in phishing e-mail message 592, user account 132 received a unique ID. Although the unique ID is shown in exemplary FIG. 6 as a 16-digit number as part of phishing URL 696, in alternative embodiments, the unique ID may have a different length, form, or be passed as a separate parameter. When phishing hyperlink 596 is selected, the unique ID, the user account 132 receives immediate notification 698 of the training requirement. Notification 698 takes advantage of the "teachable moment" by immediately informing the user what was done incorrectly, why this is a threat, and what should be done differently in the future. Additionally, informational message 699 can be displayed to allow the user to contact the help desk, if he/she is suspicious that the page shown in FIG. 6 is not authentic. This gives the user a way to confirm that they need to take the training.

FIGS. 7-12 depict a simulated browser e-mail client interface 790 used as part of a phishing training exercise. According to an embodiment, simulated browser e-mail client interface 790 may be provided by training application 112 via web server 128.

Figure 7:
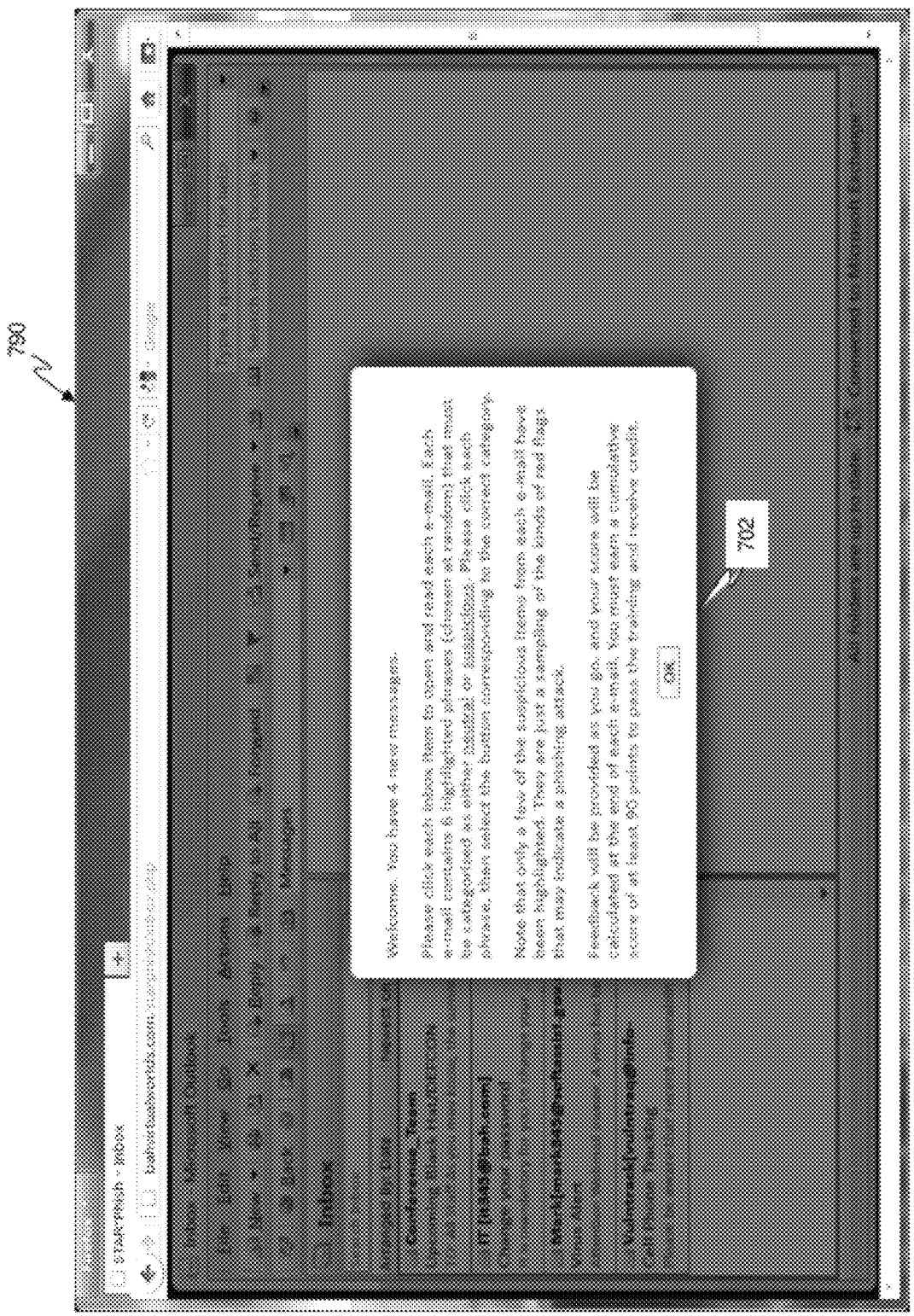
Figure 8:
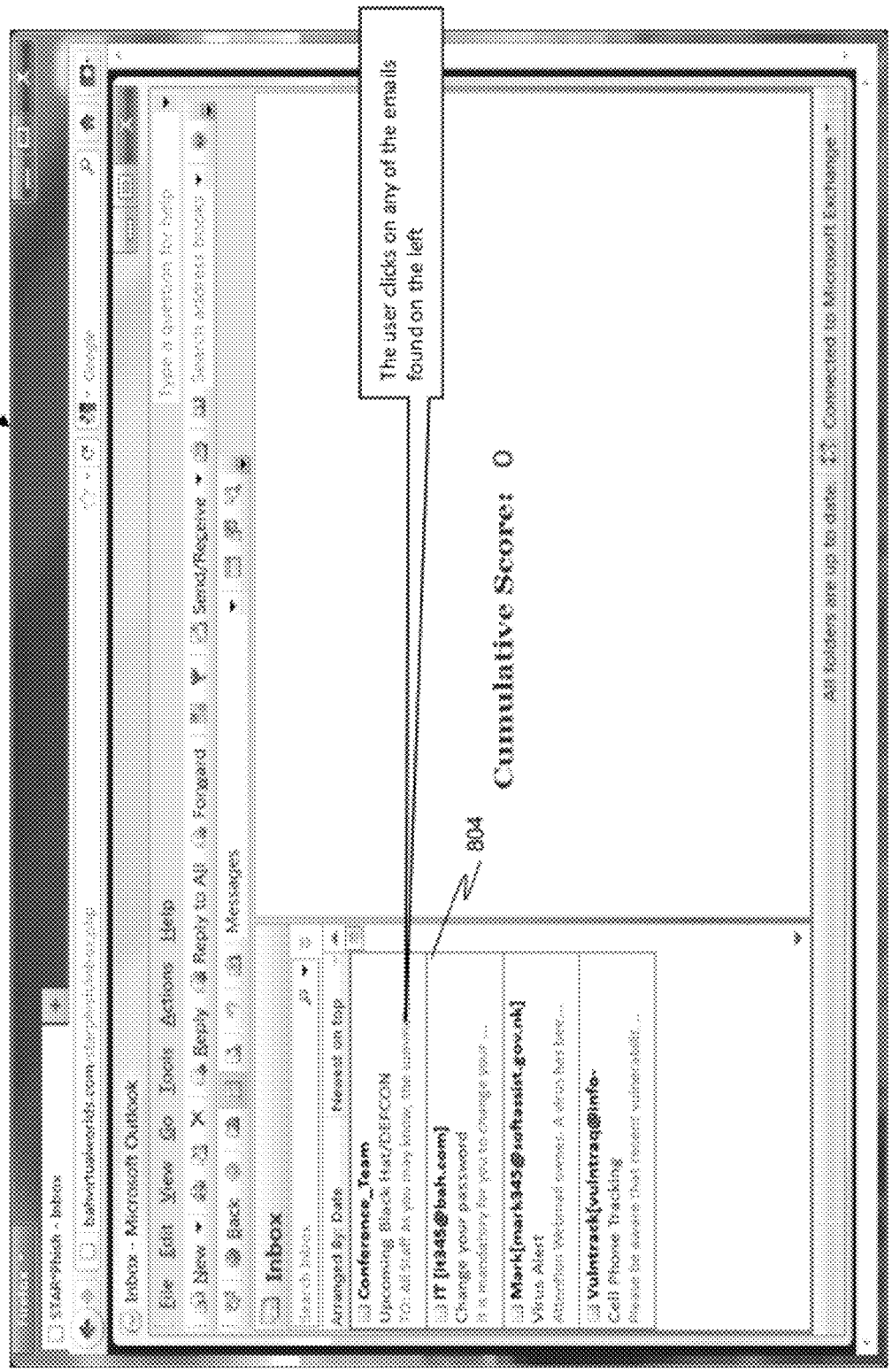

In the exemplary embodiment shown in FIG. 7, upon launching a browser session within browser 334 and logging into a user account 132, a welcome message is displayed within dialog box 702 with instructions for the training exercise. FIG. 8 illustrates that a user can select a training e-mail message 804 displayed within simulated browser e-mail client interface 790. As shown in FIG. 8, a cumulative score is displayed within interface 790 (in the exemplary display of FIG. 8, the cumulative score is 790 because the training exercise has just begun).

Figure 9:
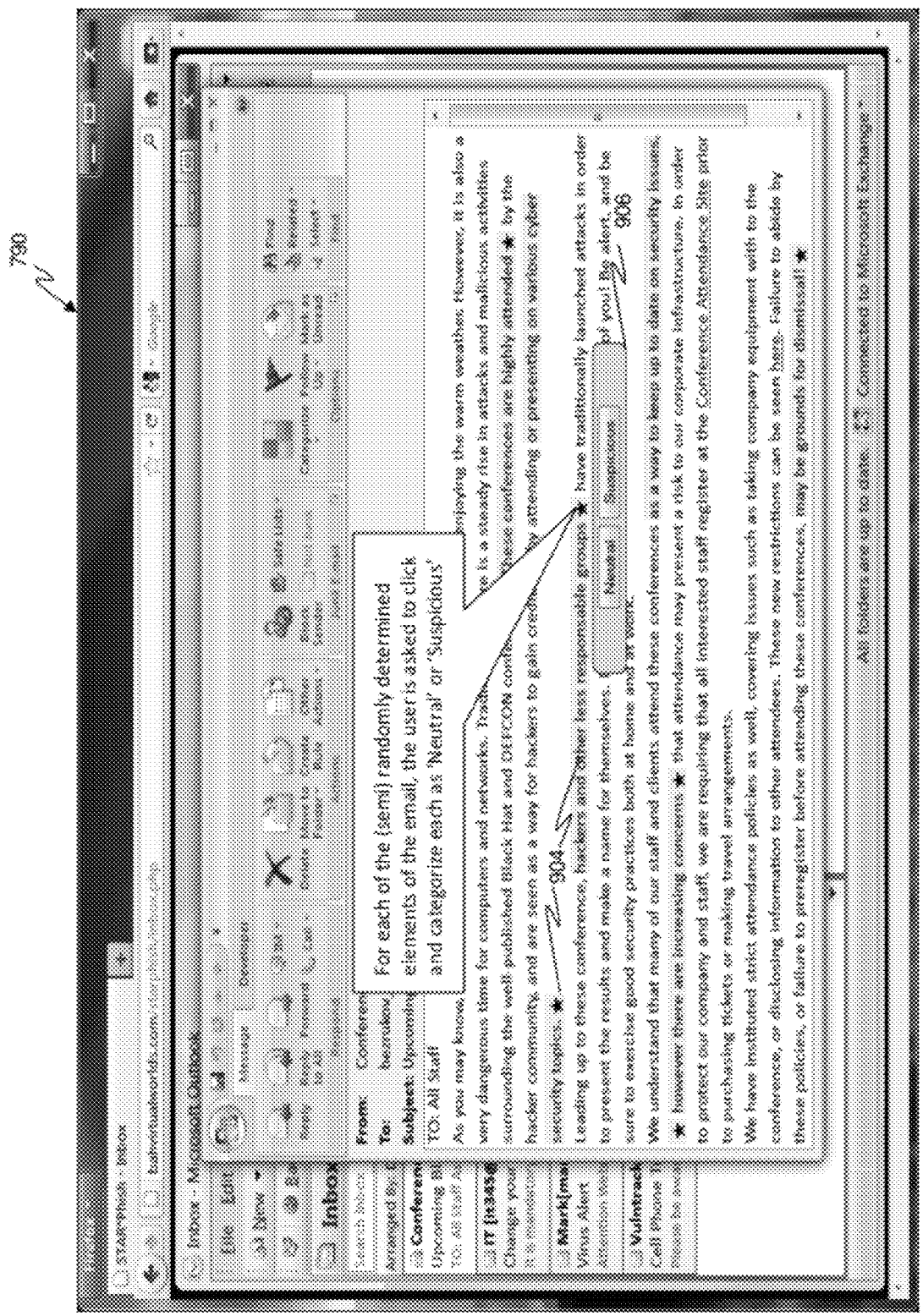
Figure 10:
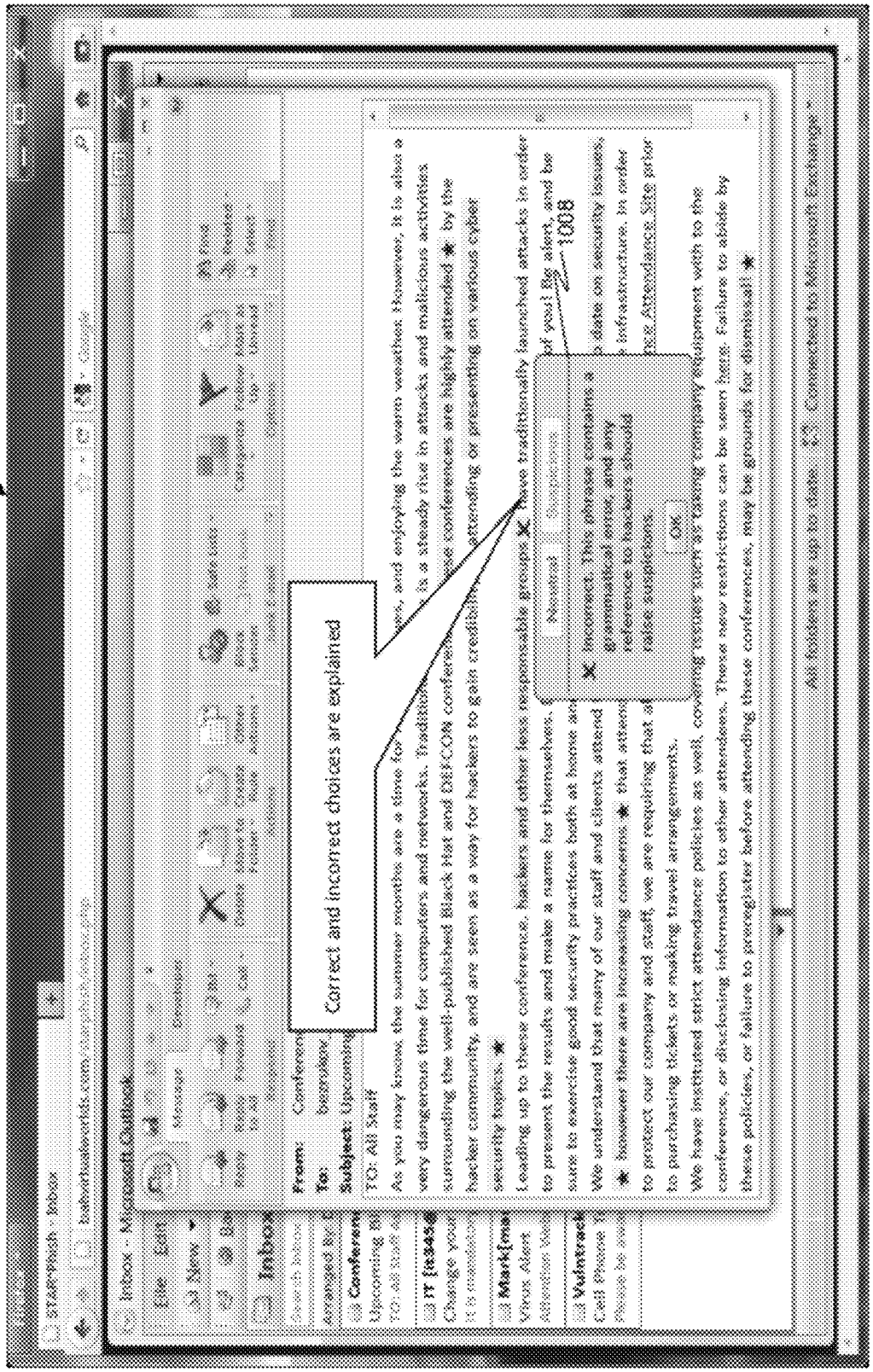

FIGS. 9-12 depict how (semi) randomly determined elements 904 of simulated phishing e-mail messages can be displayed within simulated browser e-mail client interface 790. As shown in FIG. 9, for each of the (semi) randomly determined elements 904 of the e-mail message, the user is asked to click and categorize each as 'Neutral' or 'Suspicious' by selecting buttons in dialog box 906. As illustrated in FIG. 10, correct and incorrect choices are explained in dialog box 1008, which the user must acknowledge before proceeding with the training exercise.

Figure 11:
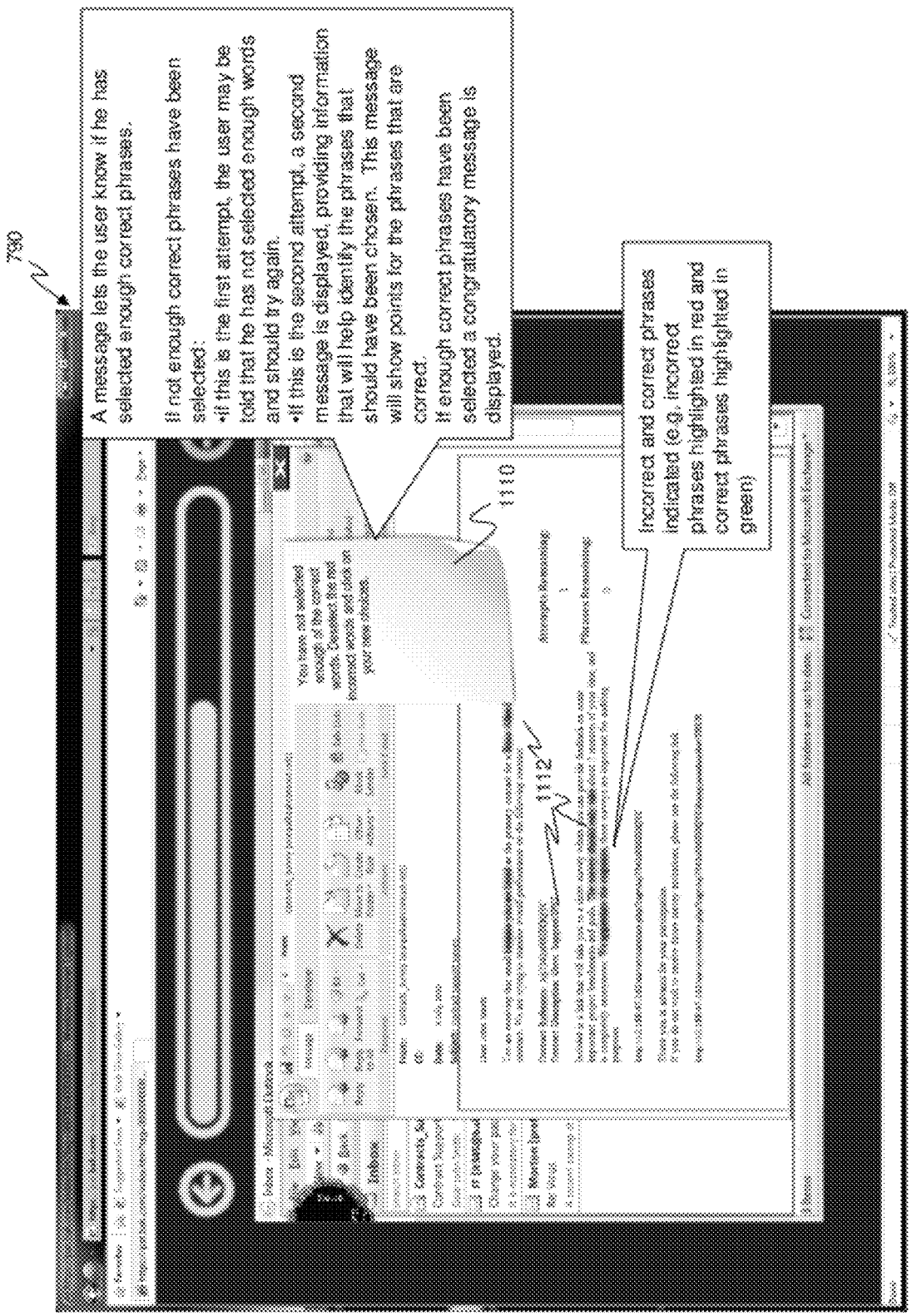
Figure 12:
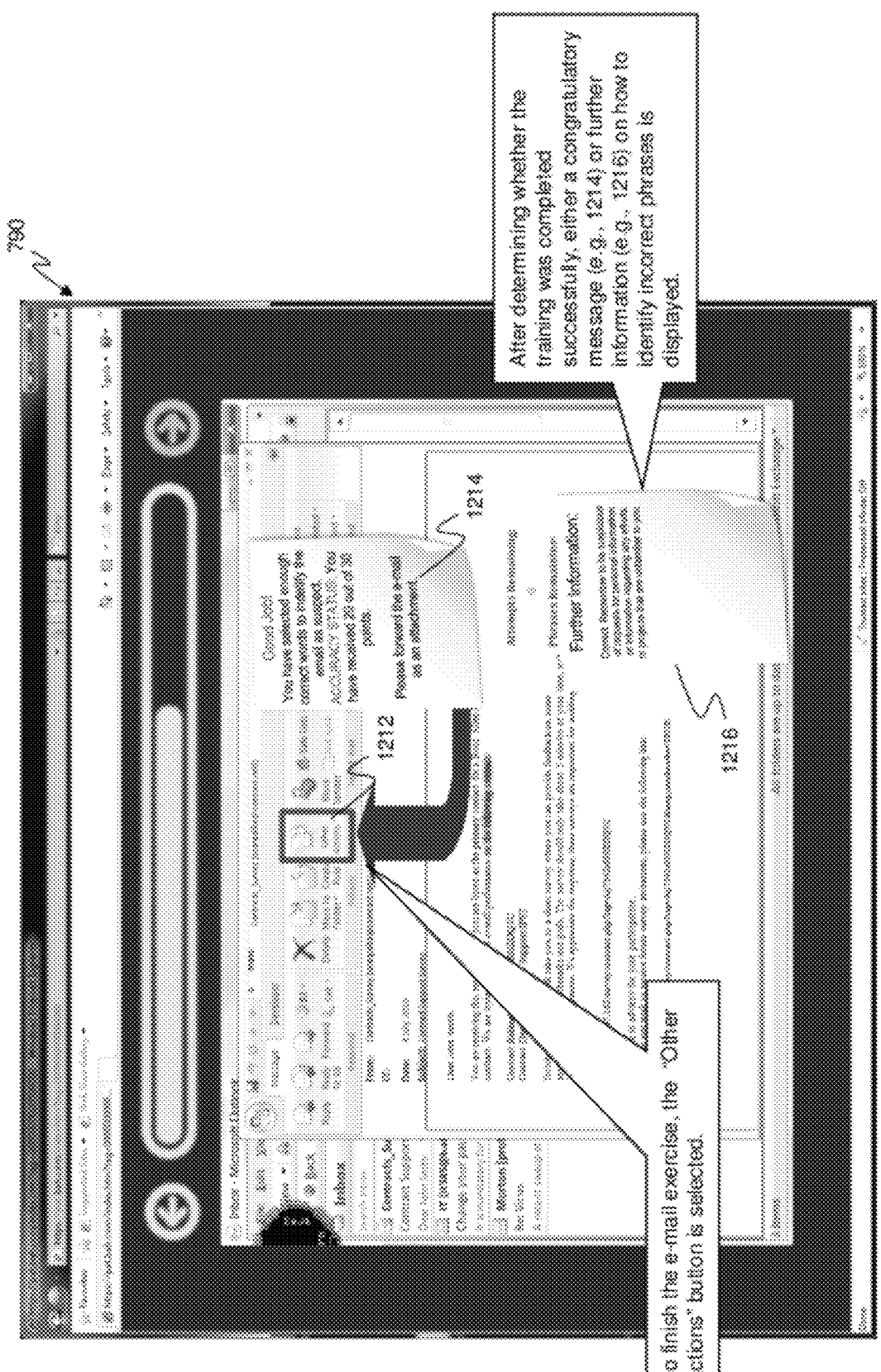

FIG. 11 depicts how incorrect and correct phrases 1112 can be indicated within simulated browser e-mail client interface 790. In the exemplary embodiment described in FIG. 11, incorrect phrases 1112 are highlighted in red and correct phrases 1112 are highlighted in green. As shown in FIG. 11, a number of remaining attempts and remaining phrases 1112 can also be displayed in simulated browser e-mail client interface 790. With continued reference to FIG. 11, a message 1110 informs the user whether he has selected enough correct phrases 1112. In an embodiment, if not enough correct phrases have been selected and if this is the first attempt, the user may be told that he has not selected enough words and should try again. Alternatively, if this is the second attempt, a second message 1110 can be displayed, providing information that will help identify the phrases 1112 that should have been chosen. This message 1110 can also show points for the phrases that are correct. As shown in FIG. 12, after determining whether the training was completed successfully, either a congratulatory message 1214 or a further information message 1216 is displayed within simulated browser e-mail client interface 790. In the exemplary embodiment of FIG. 12, the further information message 1216 can include information on how to identify incorrect phrases. If enough correct phrases 1112 have been selected, a congratulatory message 1214 is displayed. At this point, to finish the e-mail exercise, the user can select the "Other Actions" button 1212.

Although exemplary embodiments have been described in terms of a computer implemented method or apparatus, it is contemplated that it may be implemented by microprocessors of a computer, such as the computer system 1300 illustrated in FIG. 13. In various embodiments, one or more of the functions of the various components may be implemented in software that controls a computing device, such as computer system 1300, which is described below with reference to FIG. 13. The processor(s) of the computer system are configured to execute the software recorded on a non-transitory computer-readable recording medium, such as a hard disk drive, ROM, flash memory, optical memory, or any other type of non-volatile memory.

Aspects of the present disclosure shown in FIGS. 1-12, or any part(s) or function(s) thereof, may be implemented using hardware, software modules, firmware, tangible computer readable media having instructions stored thereon, or a combination thereof and may be implemented in one or more computer systems or other processing systems.

FIG. 13 illustrates an example computer system 1300 in which embodiments of the present disclosure, or portions thereof, may be implemented as computer-readable code. For example, system 100 and architectures 200 and 210 of FIGS. 1, 2A and 2B, can be implemented in computer system 1300 using hardware, software, firmware, non-transitory computer readable media having instructions stored thereon, or a combination thereof and may be implemented in one or more computer systems or other processing systems. Hardware, software, or any combination of such may embody any of the modules and components used to implement the system and architectures of FIGS. 1, 2A and 2B. Similarly, hardware, software, or any combination of such may embody modules and components used to implement the method of FIG. 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 1300. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1304 may be a special purpose or a general purpose processor device. As will be appreciated by persons skilled in the relevant art, processor device 1304 may also be a single processor in a multi-core/multiprocessor system, such system operating alone, or in a cluster of computing devices operating in a cluster or server farm. Processor device 1304 is connected to a communication infrastructure 1306, for example, a bus, message queue, network, or multi-core message-passing scheme.

Computer system 1300 also includes a main memory 1308, for example, random access memory (RAM), and may also include a secondary memory 1310. Secondary memory 1310 may include, for example, a hard disk drive 1312, removable storage drive 1314. Removable storage drive 1314 may comprise a floppy disk drive, a magnetic tape drive, an optical disk drive, a flash memory, or the like.

The removable storage drive 1314 reads from and/or writes to a removable storage unit 1318 in a well known manner. Removable storage unit 1318 may comprise a floppy disk, magnetic tape, optical disk, etc. which is read by and written to by removable storage drive 1314. As will be appreciated by persons skilled in the relevant art, removable storage unit 1318 includes a non-transitory computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300. Computer system 1300 may also include a communications interface 1324.

Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 may be in the form of signals, which may be electronic, electromagnetic, optical, or other signals capable of being received by communications interface 1324. These signals may be provided to communications interface 1324 via a communications path 1326. Communications path 1326 carries signals and may be implemented using wire or cable, fiber optics, a phone line, a cellular phone link, an RF link or other communications channels. In this document, the terms "computer program medium," "non-transitory computer readable medium," and "computer usable medium" are used to generally refer to media such as removable storage unit 1318, removable storage unit 1322, and a hard disk installed in hard disk drive 1312. Signals carried over communications path 1326 can also embody the logic described herein. Computer program medium and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the present disclosure as discussed herein. In particular, the computer programs, when executed, enable processor device 1304 to implement the processes of the present disclosure, such as the stages in the methods illustrated by the message sequence chart 300 of FIG. 3, discussed above. Accordingly, such computer programs represent controllers of the computer system 1300. Where the present disclosure is implemented using software, the software may be stored in a computer program product and loaded into computer system 1300 using removable storage drive 1314, interface 1320, and hard disk drive 1312, or communications interface 1324.

Embodiments of the present disclosure also may be directed to computer program products comprising software stored on any computer useable medium. Such software, when executed in one or more data processing device, causes a data processing device(s) to operate as described herein. Embodiments of the present disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way. Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for identifying and mitigating information security risks, the method comprising:
assigning schemes and unique identifiers to a plurality of target e-mail addresses, wherein each e-mail address is associated with an individual user account, respectively;
delivering an e-mail message to one or more of the plurality of target e-mail addresses, wherein the e-mail message comprises a hypertext transfer protocol (HTTP) request and a unique identifier associated with a user account;
receiving, at a Phishing Metric Tool (PMT), a response including the unique identifier;
logging, by the PMT, a training requirement for the user account;
tracking, by the PMT, response metrics for the training requirement;
redirecting the HTTP request to a phishing training tool (PTT);
sending, by the PTT, a notification of a verified identity of the user account and the unique identifier to the PMT;
returning a status report for the training requirement, the status report including an indication of whether the user account has failed at least a portion of the training requirement; and
redirecting, by the PMT, the user account to undergo an additional training requirement related to portion of the training requirement which was failed, upon receipt of the status report, when the status report indicates that the user account has failed at least the portion of the training requirement so that the user account is subjected to the additional training requirement at the time the user account failed the portion of the training requirement,
wherein the PMT and the PTT are respectively implemented by at least one processor of a computer processing device.

2. The method of claim 1, wherein each target e-mail address is associated with a user account in an organization, and a training exercise is associated with the training requirement for the user account respectively associated with the target e-mail address.

3. The method of claim 2, further comprising:
updating, by the PMT, the status of the training requirement,
wherein the status is based at least in part on the tracked response metrics.

4. The method of claim 3, wherein the status indicates at least one of:
a response to the e-mail message has not been received;
the training exercise is underway;
the training exercise has been completed unsuccessfully;
the training exercise has been completed successfully;
a certificate for a successfully completed training exercise has been generated; and
a notification for a completed training exercise has been sent.

5. The method of claim 4, wherein the notification is an e-mail message sent to the target e-mail address.

6. The method of claim 4, further comprising:
sending a reminder notification to the target e-mail address in response to determining that the user account has not completed information security training within a pre-determined period of time.

7. The method of claim 4, wherein the notification is an e-mail message sent to an administrator e-mail address associated with a system administrator of the organization.

8. The method of claim 7, further comprising:
sending a reminder notification to the administrator e-mail address in response to determining that the user account has not completed information security training within a pre-determined period of time.

9. The method of claim 2, further comprising:
receiving, at the PTT, credentials for the user account;
validating, by the PTT, the credentials for the user account; and
verifying a login to the user account based upon the validated credentials; and
sending a start exercise message for the training exercise based upon verifying the login.

10. A non-transitory computer readable storage medium having program instructions stored thereon for identifying and mitigating information security risks, the instructions being executable by a processor of a computing device, the instructions comprising:
instructions for receiving, at a phishing metrics tool (PMT), a phishing hypertext transfer protocol (HTTP) request;
instructions for sending a redirect message from the PMT to a browser session;
instructions for receiving, at a phishing training tool (PTT), a request for an application, wherein the request is based at least in part on the received phishing HTTP request;
instructions for sending, from the PTT to the browser session, the requested application;
instructions for sending, from the PTT, a start message for a first training requirement;
instructions for sending, from the PTT, a training exercise associated with the first training requirement;
instructions for returning a status report for the first training requirement, the status report including an indication of whether at least a portion of the first training requirement has been failed; and
instructions for redirecting, by the PMT, the browser session to undergo an additional training requirement related to portion of the first training requirement which was failed, upon receipt of the status report, when the status report indicates that the at least the portion of the first training requirement has been failed so that a user using the browsing session is subjected to the additional training requirement at the time the portion of the first training requirement was failed.

11. The non-transitory computer readable storage medium of claim 10, wherein the instructions further comprise:
instructions for determining whether the training exercise has been completed; and
instructions for generating a completion message in response to determining that the training exercise has been completed.

12. The non-transitory computer readable storage medium of claim 11, wherein the instructions further comprise:
instructions for sending the completion message from the PTT to the PMT in response to determining that the training exercise has been completed.

13. The non-transitory computer readable storage medium of claim 10, wherein the training exercise is an ADOBE™ Flex application.

14. The non-transitory computer readable storage medium of claim 10, wherein the training exercise is an ADOBE™ Flash application.

15. The non-transitory computer readable storage medium of claim 10, wherein the training exercise is an HTML5 application.

16. A system capable of identifying and mitigating information security risks, the system comprising:
  a phishing metric tool (PMT) configured to:
    receive a phishing hypertext transfer protocol (HTTP) request from a browser session; and
    send a redirect message to the browser session, the redirect message redirecting the browser session to a phishing training tool (PTT);
  an e-mail server configured to:
    send an e-mail message to a target user account, wherein the e-mail message is based on the phishing HTTP request, and wherein the e-mail message includes a unique identifier; and
    receive a response from the target user account, wherein the response includes the unique identifier;
  wherein the PTT is configured to:
    receive an application request based on the response;
    send the requested application to the browser session;
    send a start message for a training requirement for the target user account;
    send a training exercise associated with the training requirement;
    send a notification to the PMT of an identity of the target user account and the unique identifier; and
    update a status of the training exercise, the status of the training exercise including an indication of whether the user account has failed at least a portion of the training requirement,
  wherein the PMT is configured to redirect the user account to undergo an additional training requirement related to portion of the training requirement which was failed, upon receipt of the status, when the status indicates that the user account has failed at least the portion of the training requirement so that the user account is subjected to the additional training requirement at the time the user account failed the portion of the training requirement, and
  wherein the PMT and the PTT are respectively implemented by at least one processor of a computer processing device.

17. The system of claim 16, wherein the PTT is in a trusted domain associated with an organization and wherein the target user account is associated with the organization.

18. The system of claim 17, wherein the PMT is in an untrusted domain external to the organization comprising at least one web server and one or more distributed phishing agents.

19. The system of claim 16, wherein the PMT is further configured to send a reminder notification in response to determining that the training exercise has not been completed within a designated time period.

20. The system of claim 16, wherein the PTT is further configured to send a completion notification in response to determining that the training exercise has been completed.

* * * * *